INVENTOR.
Giordano Tomelleri
BY
Shoemaker and Mattare
ATTORNEYS

United States Patent Office 3,282,396
Patented Nov. 1, 1966

3,282,396
MECHANICAL APPARATUS FOR ORIENTATING FRUIT AND VEGETABLES OF ELONGATED SHAPE
Giordano Tomelleri, 22 Via Montorio, Verona, Italy
Filed Nov. 12, 1964, Ser. No. 410,499
Claims priority, application Italy, Nov. 18, 1963, 23,861/63
7 Claims. (Cl. 198—33)

The invention relates to an apparatus adapted to locate fruit and vegetables of oval and oblong shape, each contained in a suitable seating, in the ideal position for processing, for example pipping, shelling, coring, peeling and similar operations.

One object of the invention is to orientate the products in such a manner that their major axis is disposed at right angles to the mean support plane of the said products, which is virtually horizontal.

A further object of the invention is to maintain the products in the ideal position for processing.

Other objects of the invention will become apparent during the course of the following description which is to be read with reference to the appended drawings, by way of non-limitative example, illustrating two preferred embodiments of the invention, in which.

Figure 3:
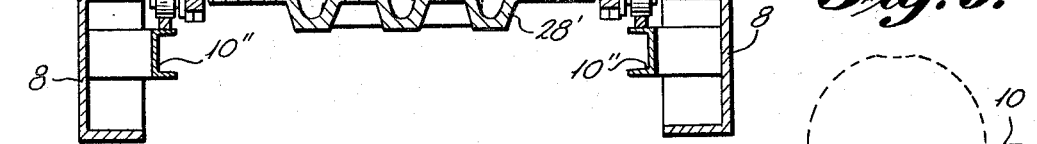
FIG. 3 is a vertical cross-section on a scale larger than that used for the previous figure, of one of the elements of the apparatus and of the cavity containing an olive, associated with the aforesaid element.
Figure 3:
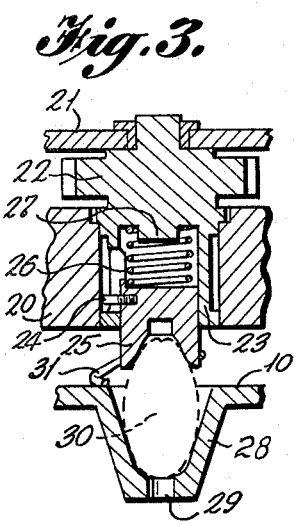
Figure 4:
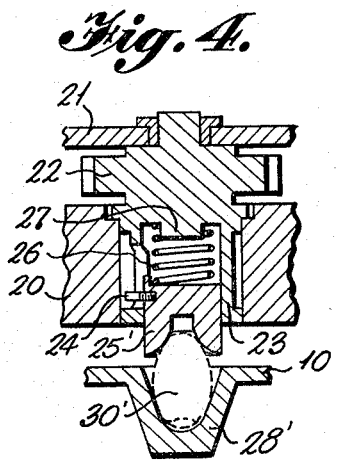
Figure 5:
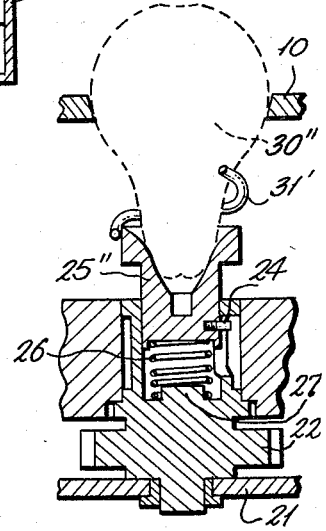

FIG. 4 is a cross-sectional view similar to the one shown in FIG. 3, showing an alternative embodiment of the head of the orientating element, acting on a kernel contained in an enclosed cavity; and FIG. 5 is an alternative embodiment of the head of the orientating element taken on a cross-section similar to that of FIGS. 3 and 4, but operating from the bottom upwards, for orientating a pear located upside-down in an almost annular seating.

Figure 1:
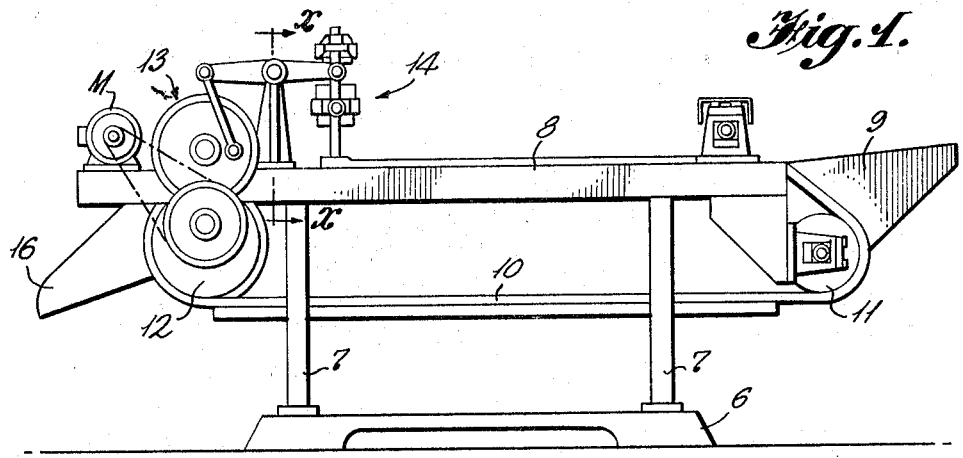
FIG. 1 is a diagrammatic side-elevation of a machine for processing oval shaped fruits or vegetables, equipped with the apparatus according to the invention.

In the various figures the same reference numerals and letters are used to indicate equivalent component parts. The machine shown in FIG. 1 rests on a base 6, from which extend uprights 7 to support side members 8 on which is mounted the orientating apparatus 14. A charging hopper 9 feeds an endless belt 10 mounted on gearwheels 11 and 12 which rotate in bearings integral with the frame of the machine, by the action of transmissions and rotary assemblies generally indicated by the reference numeral 13, deriving their drive from a motor M. The said driving motor M, through rotary assemblies and kinematic chains also generally indicated by the reference numeral 13, also drives, with a vertical reciprocating movement, the plate 20 carrying the operative elements of the orientating apparatus 14. It must be noted, although not illustrated in the drawings, that the machine, subsequently or jointly with the orientating apparatus, is provided with other devices, for example devices for pipping, stoning, or shelling of fruit, for peeling, coring and similar operations, whereby the products, when processing is completed, are discharged by the belt 10 into a chute 16, to be carried finally away from the machine.

The belt 10 which comprises small, articulatingly connected small plates is moved, with an intermittent feed movement, by means of rollers 10' supported on rails 10" integral with the side members 8 on which two uprights 17 are supported. The uprights 17 are connected with each other by a cross member 18 having a central hole to allow passage of a motor K, said uprights 17 guide, by means of bushes 19, the plate 20 during vertical displacements of the plate 20.

The plate 20, on which is attached a housing 21, is provided with seatings which, in conjunction with other seatings provided on housing 21, provide a mounting for gearwheels 22 which derive their rotational movement from the motor K. As can be seen in particular in FIG. 3, the cylindrical extension 23 of each gearwheel 22 are located in the seatings provided in the plate 20. A vertical aperture is provided in each cylindrical extension through which extends the end portion of a member 24 in the form of a pin fixed at one end to a head 25. Engagement of the pin with the walls of the aperture causes the head 25 to move with the rotary movements of the gearwheels 22. The head 25 is urged downwardly by the action of a helical spring 26 housed within the cylindrical extension 23 and located by a spring-guide 27. The outer end portion of each head 25 may be shaped in a plurality of ways, as will be described hereinafter. The cylindrical extension 23, when a fruit such as that indicated at 30 checks the downward travel of the head 25, can slide over the surface of the head 25 against the resistance of the spring 26 until the member 24 contacts the top of the aperture into which it projects.

The belt 10 is provided with cavities 28' with closed bottoms adapted to receive for example nuts 30' which are to be shelled, or cavities such as indicated at 28 in FIG. 3, each adapted to receive for example olives which are to be stoned, such apertures 28 therefore having an opening 29 in the base to permit the ejection of the kernel.

The orientating head 25, as shown in FIG. 3, ends in a concave, cone shaped flaring corresponding to the shape of the top of the olive 30 underneath, so that the contact surface between the fruit and the head 25 is quite large. The flared portion of the head 25 may, for certain processes, be of convex concoid shape, such as that of head 25' of FIG. 4, when the area of contact with the nut 30' is very limited.

On the exterior of each head 25 is fixed, in any known manner, the end of a conical spiral element 31 which diverges towards the bottotm, and it is obvious that, although not illustrated in FIG. 4, the said element 31 may be adapted also for the orientating head 25'. When, by the intermittent feed of the belt 10, the small articulated plates carrying in their cavities 28, 28' the products 30, 30' which are to be orientated arrive under the orientating apparatus 14, the products 30, 30' are actually orientated during the dwell period of the belt movement. The rocker device 13 commences the lowering of the plate 20 in the direction indicated by the arrow F shown in FIG. 2 whilst an arrester make-and-break switch, not shown, operates the motor K which causes the intermeshing gears 22 to rotate and, by means of the cylindrical extensions 23 of said gears 22, the heads 25 and the conical spiral arms 31 also rotate. The spiral arms 31 are adapted to engage and straighten the products 30, 30' which at the time of being loaded at 9, although being arranged virtually transversely in the cavities 28, 28', may not have been fully inserted therein. Said spiral straightening arms 31, therefore, locate the products 30, 30' which are badly seated in the cavities 28, 28' holding them, in such a position that they can be subsequently processed without being damaged.

As the plate 20 is lowered in the direction of the arrow S, the concave or convex conoid flared portions of the heads 25 or 25' come in contact with the top parts of the fruits 30 or 30', cause them to rotate about their major axis, without the median longitudinal axis through the fruits corresponding to the median vertical axis of the cavities 28 or 28'. It is obvious that, according to the length of travel of the plate 20 downwards, so the pressure applied by the heads 25 or 25' on the fruits 30 or 30' will be greater or less, resulting in corresponding insertion of the fruits between the sidewalls of the cavities in which they are contained.

Figure 2:
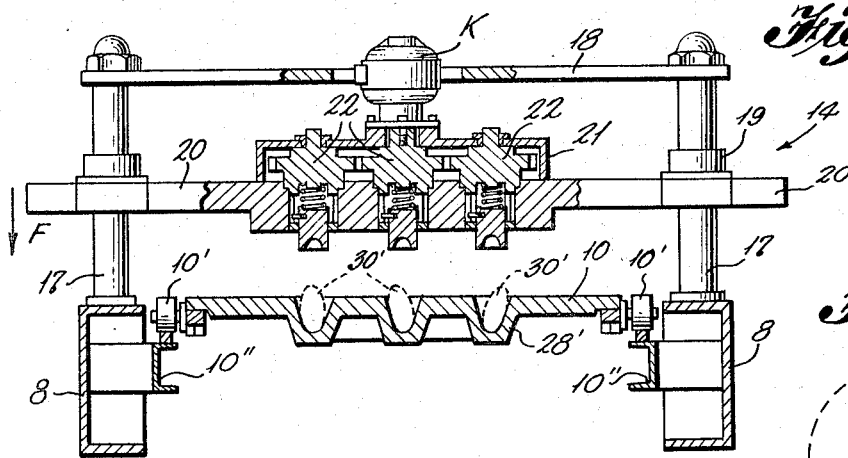
FIG. 2 is a view, on an enlarged scale taken along the direction of arrows x—x indicated in FIG. 1 and with some elements shown in partial cross-section.

The products thus having been orientated, an arrester make-and-brake switch can cut out the motor K whilst the movements of the plate 20 and rocker 13 are reversed to return the apparatus 14 to the position shown in FIG. 2. The belt 10 will then resume its movement forward and, whilst those articulated plates carrying orientated processed fruits are carried out of the range of action of the orientating apparatus, a fresh series of articulated plates will be brought under the aforesaid apparatus for a fresh orientation operation.

Kernel-ejector blades or shell-crushing members may be accommodated in cavities in each head 25 and gear 22 and operate to process the fruits when the fruits 30, 30' are held rigid in their cavities 28, 28' and rotated by the heads 25, 25', as indicated in FIGS. 3 and 4.

With particular reference to FIG. 5, it will be seen that, for orientation of pears 30", the orientating device 14 is inverted in order to orientate the fruits 30" which are carried in almost annular seatings provided on belt 10. The orientating head 25" has an upwardly divergent tapering flared portion which has a greater surface area than those in the previous figures and which is equipped likewise with a spiral arm 31' of tapering form, for straightening the fruits before these latter come in contact with the orientating head 25".

It is evident that the structural form may undergo various modifications in order to carry into effect the object of the invention, such modifications having to be considered as possible embodiments of the invention and, as such, included in the scope of the invention which is defined by the following claims.

I claim:
1. Mechanical apparatus for orientating fruit and vegetable products of elongated shape accommodated in individual cavities provided on an endless conveyor adapted to be moved intermittently comprises a plate adapted to be displaced towards and away from the conveyor, means for guiding the plate during displacement, said plate supporting a rotatable member extending towards the conveyor, means for rotating said rotatable member, a head member supported for rotation with the rotatable member, a cavity being provided on the head member adapted to contact part of the product to effect its rotation, means for altering the length of the head member to suit the length of the product, a tapering spiral arm carried by said head member and extending downwardly therefrom and diverging in a direction toward said conveyor and adapted to contact and initially position said product correctly in its cavity during orientation of said product.

2. Mechanical apparatus as claimed in claim 1, in which the cavity provided on the head member is of concave conoid shape diverging towards the product.

3. Mechanical apparatus as claimed in claim 2, in which the cavity provided on the head member is of convex conoid shape diverging towards the product.

4. Mechanical apparatus as claimed in claim 2, in which the means for altering the length of the head member comprises a sleeve extending from said rotatable member, the head member being slidable in said sleeve, a slot provided in the sleeve, a pin secured to the head member adapted to extend into the slot, a spring housed in the sleeve engageable with the head member and adapted to urge said head member towards the product.

5. Mechanical apparatus as claimed in claim 3, in which the means for altering the length of the head member comprises a sleeve extending from said rotatable member, the head member being slidable in said sleeve, a slot provided in the sleeve, a pin secured to the head member adapted to extend into the slot, a spring housed in the sleeve engageable with the head member and adapted to urge said head member towards the product.

6. Mechanical apparatus as claimed in claim 4, in which said rotatable member comprises a gear wheel, a first seating for the gear wheel provided on said plate, a gear wheel housing secured to said plate, a second seating for the gear wheel provided on said housing, motor means supported on said plate, drive transmitting means from said motor to said gear wheel.

7. Mechanical apparatus as claimed in claim 5, in which said rotatable member comprises a gear wheel, a first seating for the gear wheel provided on said plate, a gear wheel housing secured to said plate, a second seating for the gear wheel provided on said housing, motor means supported on said plate, drive transmitting means from said motor to said gear wheel.

References Cited by the Examiner
UNITED STATES PATENTS

| | | | |
|---|---|---|---|
| 2,232,210 | 2/1941 | Carroll | 198—33.1 |
| 2,247,602 | 7/1941 | Carroll | 198—33.2 |
| 2,683,521 | 7/1954 | Reynolds | 198—33.2 |
| 2,826,291 | 3/1958 | Kagle et al. | 198—167 |
| 2,935,176 | 5/1960 | Lorenzen | 198—33.1 |
| 2,968,387 | 1/1961 | Lagler | 198—33.2 |
| 3,163,282 | 12/1964 | Shropshire et al. | 198—33 |

EVON C. BLUNK, *Primary Examiner.*

SAMUEL F. COLEMAN, *Examiner.*

R. M. WOLKER, M. L. AJEMAN,
*Assistant Examiners.*